Patented Apr. 9, 1940

2,196,469

UNITED STATES PATENT OFFICE 2,196,469

RECONSTITUTED MINERAL SURFACED FELT AND MANUFACTURE OF SAME

William J. Moeller, Mount Healthy, Harold W. Greider, Wyoming, and Marion F. Smith, Cincinnati, Ohio, assignors to The Philip Carey Manufacturing Company, a corporation of Ohio No Drawing. Application September 6, 1935, Serial No. 39,498. Renewed August 31, 1939

18 Claims. (Cl. 92—3)

This invention relates to the manufacture of felted products fabricated from a pulp suspension of feltable fibers, thermoplastic material and granular material, and particularly pertains to felted products reconstituted from waste thermoplastic treated fabrics, woven and felted, such as those which accumulate in the manufacture of bituminized fabrics for building, water-proofing and insulating purposes and the like such as prepared roofings where a fabric foundation, felted or woven, is saturated and/or coated with suitable waterproofing thermoplastic substances. The invention relates to the method of reconstituting the waste thermoplastic material treated fabrics into a uniformly mixed and homogeneous felted sheet and products made therefrom. It also relates to thermoplastic material compounded with suitable proportions of feltable fibers and inorganic material, said inorganic material being finely dispersed and held in suspension throughout the mass.

The thermoplastic substance treated fabric material comprises that which is saturated or coated only, that which is both saturated and coated, and, particularly in the prepared roofing industry, that which is saturated, coated and is covered with granular or finely divided mineral or other surfacing material partially embedded in the coating, which may also contain fine mineral filler dispersed therein. The fabric material varies greatly as to character and kind, including felted fabrics composed of various types of fibrous material, such as rags, sacks and bagging, carpet waste, waste cotton, waste paper, wood pulp and other vegetable fibers, animal and mineral fibers, and woven fabrics, such as burlap, canvas and the like. So, too, does the granular surfacing material vary in size, ranging from fine powder to coarse granules, and kind, including such different materials as silica, slate, crushed stone, brick or tile, granulated slag, small pebbles or gravel, granulated cork, mica flakes, talc and many other materials.

In the roofing industry, for example, much of the waste in making roll roofing results from defective portions of the formed sheets, edgings and the like which are relatively large in size, whereas in making strip and individual shingles much of the waste results from cut-outs when said shingles are cut from the parent sheets. Accordingly, it will be readily apparent that the waste material varies greatly both as to the size of the waste pieces as well as in their composition and structure.

Many attempts have heretofore been made to reclaim the waste material for various uses, but these have met with only partial success in that they all have been directed only to the disintegration of the fibrous and thermoplastic material contents, leaving the granular content either mixed throughout the mass, without being broken down, or else separating out the granular surfaced waste pieces and reclaiming only the non-granular surfaced waste material. Also the waste material has heretofore been reduced to a plastic mass suitable only for molding and not reconstituted into a feltable water suspension or pulp suitable for reforming into a waterlaid felt.

It is the aim of the present invention not only to reduce this heterogeneous waste material to a homogeneous, uniformly mixed pulp as to the fibrous and thermoplastic material contents of the waste material, but also to reduce all ingredients of the waste, including the granular surfacing material, mineral filler, cork, mica and the like to a homogeneous, finely divided, uniformly mixed condition so that the entire composition becomes a feltable pulp stock. A further aim of the invention is to effect disintegration of the waste material by means of apparatus more conventional for use in the manufacture of the original products from which the waste accumulates rather than being of special design and adapted only for the disintegration of the waste material.

Generally described, the heterogeneous waste may be collected as it accumulates in the production of thermoplastic material treated products and advantageously subjected to a shredding or cutting device for reducing same to smaller pieces and making them more uniform for convenient handling in subsequent operations. While this step is preferable, especially for speeding up production, it is not indispensable as subsequent steps of the process are sufficient for homogenizing the waste material.

After being shredded, cut, or otherwise reduced to smaller pieces for more convenient handling, the waste material is subjected to a mechanical dispersing operation in the presence of water to form a pulp stock, said mechanical operation being sufficiently drastic to break down the thermoplastic component and disperse same through the pulp stock. This may be effected in a conventional beater for the preparation of feltable pulp stock which comprises a beater roll adjacent a stationary plate to which the waste material is fed in a circulating chamber. A sufficient amount of water is used in the circulating chamber to facilitate circulation of the waste material through the beater. This is preferably heated to render the thermoplastic material content fluid or semi-fluid and adapted to be readily circulated and effectively dispersed in the beating operation without sticking and gumming the beater apparatus and circulating chamber. This heating may preferably raise the water temperature to a range of from 170° to 212° F. Other materials may also be added to render the thermoplastic material non-adhesive and for dispersing same in fine particles throughout the pulped mass. Various hydrous gel-forming inorganic compounds are suitable as dispersing agents, these being typified by such materials as ball clay, kaolin, Portland cement, bentonite clay, magnesium oxide, colloidal silica and the like or a mixture of two or more of such materials in varying proportions. With any one of these or a mixture thereof there may in some cases advantageously be used a suitable surface tension reducing material, typified by such materials as soap, sulphonated oils and their salts, saponified rosins, salts of sulphonated higher fatty alcohols and the like as suitable examples. The surface tension reducing means should be one that is compatible with the dispersing agent. Protective colloids, such as glue, starch and casein, may also be used as adjunctive dispersing and stabilizing agents for the thermoplastic material.

In prepared roofing comprising a saturated felt base, the felt ordinarily is saturated with asphalt to about 150% to 200% of the dry weight of the fabric. Thus the saturant together with the thermoplastic coatings, applied to the saturated felt foundation usually considerably preponderates (by weight) in proportion to the fiber and/or mineral content. Accordingly it may be desirable to add additional fibrous filling material, preferably any suitable vegetable, mineral or animal fibers as these will dilute the thermoplastic component and increase the felting qualities of the pulp and permit same to be felted in a conventional manner on a cylinder or Fourdrinier felt or paper machine. The additional fibrous material has the further advantage of reducing any tendency of the beaten stock to be adherent to the apparatus in which it is being treated. Suitable fibrous material for this purpose is typified by cotton, wool, jute, rag, paper, and others generally employed in making roofing fabrics. On the other hand the thermoplastic content of the waste roofing material may be subordinate in proportion to the non-thermoplastic content, or it may be desirable to modify the fiber composition of the reconstituted felt by adding a considerable quantity of fibrous material, in which event a quantity of thermoplastic material may also be added. This may be added at any stage of the process prior to felting but is preferably at the point where the water and dispersing agent are added, which in conventional felt making apparatus would be the beater. Addition of it at any early stage of the process facilitates mixing and dispersion of same while the other ingredients are undergoing the same treatment. The added thermoplastic material is represented by any relatively soft flux type, blown saturant type or previously emulsified asphalt. One advantage of adding thermoplastic material of this type is that the roofing scrap has a large amount of bituminous adhesive coating on the surface or surfaces thereof, and the soft flux or blown saturant incorporated therewith will blend with the adhesive coating material of harder consistency and higher softening point and facilitate its dispersion throughout the pulp stock. Furthermore the pulp stock and the sheet felted therefrom will be softer and more flexible.

The waste material with or without the added fibrous material, is beaten in water at a suitable temperature to reduce the fibrous content to the condition of pulp and until the thermoplastic content has been dispersed throughout the water and thoroughly mixed with the fibrous pulp stock. The mechanical treatment thus far described has been aimed at breaking down and dispersing the thermoplastic content throughout the pulp stock. The granular material may be incidentally broken down somewhat, although not to any great extent, but it will be thoroughly distributed throughout and suspended in the pulp stock, which is suitable for being waterlaid into a web on a cylinder machine or on a Fourdrinier machine.

For the production of some products from the waste material, it is desirable to refine the fibrous material further and to completely disintegrate or pulverize the granules and this may be advantageously effected by subjecting the beaten pulp stock to another mechanical operation, such as in a rod mill. This is merely representative of one suitable device for carrying out this mechanical operation. Other devices such as a ball mill or the like, which will grind and pulverize the granular material, are suitable. The rod mill comprises a number of rods loosely carried in a housing or cylinder, said rods being adapted to roll and tumble over each other and cascade with the waste stock therebetween as the cylinder is turned on its horizontal axis. The rod mill grinds or crushes the granular material to a very fine condition and rubs the fibrous contents of the waste mass to a refined and well fibrillated condition, as well as thoroughly intermingling and mixing all components into a homogeneous pulp of uniform character, suitable after further dilution with water to obtain the proper consistency for being felted into a web on a cylinder or Fourdrinier machine in the usual manner. This mechanical operation is also carried out at the same elevated temperature as the first mechanical operation and hence the rod mill may be heated for this purpose.

The felted web may be smooth finished or it may be embossed. By reason of the thermoplastic ingredient in the sheet, the sheet is particularly suitable for receiving embossments which may be provided by an embossing roll associated with the calender rolls at the discharge end of the cylinder machine. The felt embosses without breaking and at this stage of manufacture is in a warm condition suitable for receiving the embossments. As the sheet cools the embossments are permanently retained. Embossed felt sheets are especially adapted for heat insulating, lining and sound deadening purposes.

The web after drying, whether embossed or smooth finished, may be further waterproofed by being impregnated with a saturant and/or coated on one or both sides with a layer of thermoplastic material such as a bituminous adhesive compound.

Granular surfacing material may also be partially embedded on one or both of the coating layers. Sheets thus produced are particularly adapted for weather surfacing, in that the waterproofing material is more thoroughly dispersed throughout the fibrous content, thereby better protecting same against exposure to the elements.

Likewise, the mineral content is thoroughly distributed in finely divided form throughout the felted sheet giving same a more durable character and spacing the fibers therein to increase the permeability of the sheet for the reception of the waterproofing material.

While the invention has been described above particularly in reference to asphaltic treated felt products, it is likewise suitable for making reconstituted felt from fabrics impregnated and/or coated with various and many other kinds of thermoplastic materials, such as crude and reclaimed rubber, rosin, synthetic resins, drying oil compositions of the character of linseed, Chinawood oil and the like, shellacs, paraffin, natural fossil resins, tar, cumarone resin and others which are used in various forms for treating fibrous products.

While the invention has been described in detail as to the process of manufacture and the resulting product, it will be understood, however, that it is not limited thereby but that there may be various changes without departing from the invention.

We claim:

1. A felted product formed from thermoplastic substance treated fabrics, containing grit material, reconstituted in a sheet with the components homogeneously mixed and finely ground together, the grit material being reduced in a finely divided condition and the fibers being in felted relation.

2. A felted product formed from thermoplastic substances treated fabrics, containing grit surfacing material, reconstituted in a sheet with the components homogeneously mixed and finely ground together, the grit material being reduced in a finely divided condition and the fibers being in felted relation and waterproofing material applied to the sheet.

3. A felted product formed from thermoplastic substance treated fabrics, containing grit material, reconstituted in a sheet with the components homogeneously mixed and finely ground together, the grit material in finely divided condition and the fibers in felted relation, waterproofing material applied to the sheet and granular surfacing material covering the waterproofing material.

4. A felted product formed from thermoplastic substance treated fabrics, containing grit material, reconstituted in a sheet with the thermoplastic substance treated fabrics, including the grit material, homogeneously mixed and ground together, the grit material being reduced in subdivided condition and the fibers being in felted relation.

5. A process for reclaiming thermoplastic substance treated fabrics having associated therewith grit material, comprising subjecting the thermoplastic substance treated fabric and associated grit material to a disintegrating operation in the presence of an aqueous liquid for dispersing the thermoplastic substance, grinding the grit material and the other ingredients of the thermoplastic treated fabrics together to subdivide the grit material, and forming the resulting composition, including the grit material, into a sheet.

6. A process for reconstituting thermoplastic substance treated fabrics into a felted sheet comprising subjecting mineral grit surfaced thermoplastic substance treated fabrics to a disintegrating operation in the presence of an aqueous liquid for disintegrating same into a pulp stock, heating the pulp stock, incorporating an agent for dispersing the thermoplastic substance, subjecting the pulp stock to a rolling operation to reduce the grit material to subdivided condition and mix same in a subdivided condition with the other contents of the pulp stock, and felting the pulp stock, including the mineral grit, into a sheet.

7. A process for reconstituting thermoplastic substance treated fabrics into a felted sheet comprising subjecting grit surfaced thermoplastic substance treated fabrics to a beating operation in the presence of an aqueous liquid to form pulped half stock, feeding the pulp between a plurality of members adapted to roll loosely over each other for refining the fibrous content of the stock and subdividing the grit as well as intimately mixing the thermoplastic content with the refined fibrous content and the subdivided grit content, and felting the refined stock into a sheet with the fibrous, thermoplastic and subdivided grit contents intimately intermixed.

8. A process for reclaiming a thermoplastic substance having associated therewith substantially coarse grit material, consisting of subjecting the thermoplastic substance and associated grit material to a disintegrating operation in the presence of a liquid for dispersing the thermoplastic substance, reducing the grit material to a finely divided condition, and forming the resulting composition including the finely divided grit material into a sheet.

9. A process for reconstituting grit surfaced and thermoplastic substance treated fabrics into a felted sheet, comprising subjecting said fabrics and grit surfacing material with substantially all of the grit surfacing material retained to a disintegrating operation in the presence of a liquid for disintegrating same into a feltable pulp stock with the thermoplastic substance dispersed therethrough and intermixed with the disintegrated grit material, and felting the pulp stock including the disintegrated grit material into a sheet.

10. A process for reconstituting grit surfaced and thermoplastic substance treated fabrics into a felted sheet, consisting of subjecting said fabrics and grit surfacing material to a disintegrating operation in the presence of an aqueous liquid for disintegrating same into a feltable pulp stock with the thermoplastic substance dispersed therethrough, heating said fabrics and aqueous liquid while being subjected to the disintegrating operation and intermixed with the disintegrated grit material, and felting the pulp stock including the disintegrated grit material into a sheet.

11. A process for reconstituting grit surfaced and thermoplastic substance treated fabrics into a felted sheet, consisting of subjecting said fabrics and grit surfacing material to a disintegrating operation in the presence of an aqueous liquid for disintegrating same into a feltable pulp stock with the thermoplastic substance dispersed therethrough, incorporating an agent to facilitate dispersion of the thermoplastic substance through the pulp stock, heating said fabrics and aqueous liquid to soften the thermal plastic substance with which the fabrics are treated, and felting the pulp stock including the disintegrated grit material into a sheet.

12. A process for reconstituting thermoplastic substance treated fabrics into a felted sheet, consisting of subjecting grit mineral surfaced thermoplastic substance treated fabrics to a disintegrating operation in the presence of an aqueous liquid for disintegrating said fabrics and grit surfacing material into a feltable pulp stock with the thermoplastic substance dispersed therethrough, treating the pulp stock to refine the fibrous content and grind the grit mineral material sufficiently fine to not impair the feltable character of the pulp stock, and felting the pulp stock including the ground grit mineral material into a sheet.

13. A process for reconstituting thermoplastic substance treated fabrics into a felted sheet, comprising subjecting mineral surfaced thermoplastic substance treated fabrics with substantially all the grit material retained to a disintegrating operation in the presence of a liquid for disintegrating said fabrics and grit surfacing material into a feltable pulp stock with the thermoplastic substance dispersed therethrough, heating the pulp stock, incorporating an agent for dispersing the thermoplastic substance, subjecting the pulp stock to a rolling operation to refine the fibrous content and grind the grit material sufficiently fine to not impair the feltable character of the pulp stock, and felting the pulp stock including the ground grit material into a sheet.

14. A process for reclaiming a thermoplastic substance having associated therewith grit material, consisting of subjecting the thermoplastic substance and associated grit material to a disintegrating operation in the presence of an aqueous liquid for dispersing the thermoplastic substance, reducing the grit material to a finely divided condition, and forming the resulting composition including the finely divided grit material into a sheet.

15. A process for reconstituting grit surfaced and thermoplastic substance treated fabrics into a felted sheet, consisting of subjecting said fabrics and grit surfacing material to a disintegrating operation in the presence of an aqueous liquid for disintegrating same into a feltable pulp stock with the thermoplastic substance dispersed therethrough and intermixed with the disintegrated grit material, felting the pulp stock including the disintegrated grit material into a sheet, and applying a waterproofing coating to the sheet.

16. A process for reconstituting grit surfaced and thermoplastic substance treated fabrics into a felted sheet, consisting of subjecting said fabrics and grit surfacing material to a disintegrating operation in the presence of an aqueous liquid for disintegrating same into a feltable pulp stock with the thermoplastic substance dispersed therethrough and intermixed with the disintegrated grit material, felting the pulp stock including the disintegrated grit material into a sheet, applying a waterproofing coating to the sheet, and covering the coating with a granular surfacing material.

17. A process for reclaiming a thermoplastic substance having associated therewith grit material, consisting of subjecting the thermoplastic substance and associated grit material to a disintegrating operation in the presence of an aqueous liquid for dispersing the thermoplastic substance and reducing the grit material to a finely divided condition, incorporating feltable fibrous material to form a pulp stock including the finely divided grit material, and forming the pulp stock into a waterlaid sheet.

18. A process for reconstituting thermoplastic substance treated fabrics into a felted sheet, consisting of subjecting mineral grit surfaced thermoplastic substance treated fabrics to a beating operation in the presence of an aqueous liquid for reducing same to a pulp stock with the thermoplastic substance and grit material dispersed therethrough, subjecting the pulp stock to a disintegrating operation for refining the fibrous content and grinding the grit mineral content to a finely divided condition, and felting the stock into a sheet with the finely divided mineral content uniformly distributed through the sheet.

WILLIAM J. MOELLER.
HAROLD W. GREIDER.
MARION F. SMITH.